Figure 1:
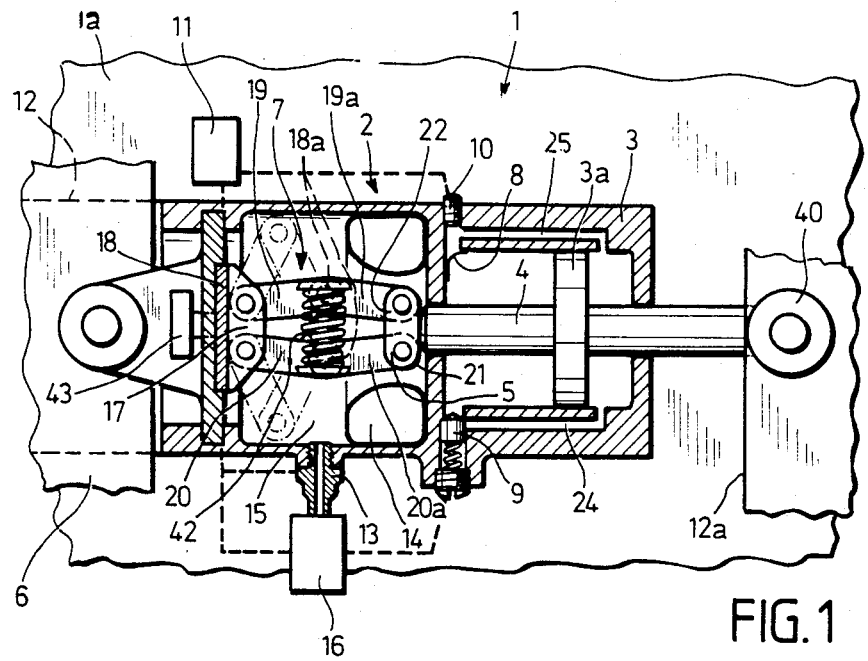

United States Patent [19]

Krafka

[11] Patent Number: 4,651,955
[45] Date of Patent: Mar. 24, 1987

[54] DEVICE FOR AUTOMATICALLY CONTROLLABLE UNLOADING OF AIRCRAFT WINGS

[75] Inventor: Herfried Krafka, Toulouse, France

[73] Assignee: Deutsche Airbus GmbH, Munich, Fed. Rep. of Germany

[21] Appl. No.: 731,535

[22] Filed: May 7, 1985

[30] Foreign Application Priority Data

May 7, 1984 [DE] Fed. Rep. of Germany ....... 3416719

[51] Int. Cl.$^4$ .............................................. B64C 13/16
[52] U.S. Cl. ................................. 244/76 C; 244/75 A; 244/75 R; 244/76 R
[58] Field of Search ................. 244/75 R, 76 R, 76 C, 244/75 A

[56] References Cited

U.S. PATENT DOCUMENTS 2,342,578 2/1944 Giannini ........................... 244/75 A

FOREIGN PATENT DOCUMENTS

| 3241456 | 5/1984 | Fed. Rep. of Germany . |
| 3310510 | 9/1984 | Fed. Rep. of Germany . |
| 859884 | 12/1940 | France ............................. 244/76 C |
| 454490 | 9/1936 | United Kingdom ............. 244/75 A |

Primary Examiner—Sherman D. Basinger
Assistant Examiner—Rodney Corl
Attorney, Agent, or Firm—Toren, McGeady and Goldberg

[57] ABSTRACT

A device for an automatically controllable off-loading of aircraft wings, arranged between the aircraft wing structure and the control surfaces, spoilers or flaps and is a single device or in the form of a plurality of devices respectively assigned to the control surface along the wing span and automatically reduces the additional loading at the aircraft wing generated by gust-and maneuver loads as well as increases the flutter speed by a dampening circuit in an electro-hydraulic manner.

15 Claims, 2 Drawing Figures

DEVICE FOR AUTOMATICALLY CONTROLLABLE UNLOADING OF AIRCRAFT WINGS

The invention is directed to a device for automatically controllable off-loading or unloading of aircraft wings, which is arranged for its actuation in between the aircraft wing structure and the control surfaces and/or spoilers and flaps.

This device is intended for utilization in aircraft wings in order to achieve for these a reduction of the gust- and maneuver loads.

From the the DE-OS No. 32 41 456 a device of the above-named species has become known, which exhibits slit-like flow channels leading from the lower surface to the upper surface of the outer wing, which are normally closed off by means of a door which opens in case an upward gust is encountered.

The disadvantage of this solution is to be seen in that on the one hand through the exclusive arrangement of the device in the outer area of the wings primarily only the structure of the outer wing can be off-loaded, but on the other hand in this area the basic strength of the structure is reduced by the channels representing large perforations. Apart from the effectiveness of this device only in case of upward gusts, it is additionally prone to many problems due to the high drag as well as the noise generation and the associated danger of flutter of the jet engine inlet pointing in the direction of flight at high flight speeds. An operational adaptation of the device to the respective flying weight is not provided.

Furthermore, a flutter brake in airplanes is described in DE-OS No. 33 10 510, which consists of extensible and retractable spoilers and vortex generators, which are controlled and thus brought into action by means of sensors distributed on the wing.

In this device, a plurality of sensors is required in a disadvantageous manner for registration of aerodynamic boundary conditions, which control through command signals the drive for actuation of the previously named aerodynamic auxiliary means. A malfunction or interruption of this command chain renders this device inoperable or triggers erroneous functions which can endanger the aircraft in flight. Furthermore, the factors of the flying weight and the mach number of the aircraft are not included in the control of the aerodynamic auxiliary means.

It is the task of the invention to propose a device which, depending on the respective flying weight and the mach number of the aircraft automatically activates the control surfaces and/or the spoilers or flaps after it has directly registered the load conditions and that hereby the gust- and maneuver loads are reduced there, where they are generated along the span of the aircraft wing and that the flutter speed can also be increased locally and over the entire surface.

This task is solved and other refinements are provided in a reliable manner by the features enumerated in the claims.

Figure 2:
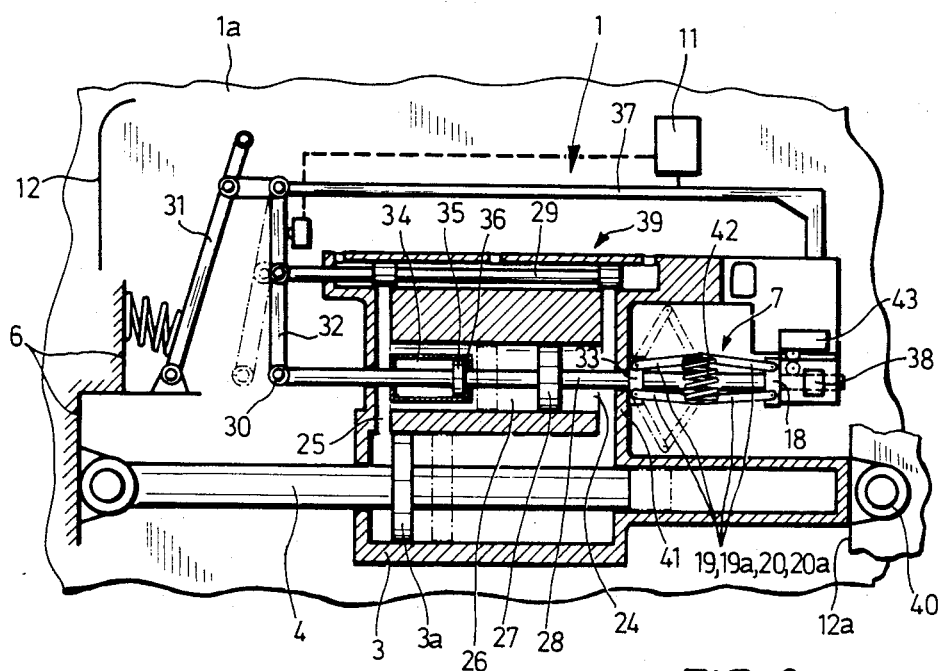

An embodiment of the invention is depicted in the drawing and is described with particularity in the following. It is shown on:

FIG. 1 is a schematic elevational representation of the device in extended position and, FIG. 2 is a view similar to FIG. 1 of the device in extended position with further refined features.

Generally the drives for the control surfaces, spoilers and flaps associated with the aircraft wings are designed in such a way with respect to the actuating forces which have to be supplied, that they are adequate for actuation of the surfaces if subjected to the maximum expected load, whereby this maximum load mostly is composed of maneuvering loads and gust loads which can be superimposed. A safe limit load under the maximum load level is predeterminable for instance by and in the flight controller as a momentarily allowable threshold load corresponding to the respective flying weight and the resulting wing loading. Because of fuel consumption or speed changes a continuous change of the order of magnitude of this threshold load occurs in flight.

The additional loading above the limit load value can be reduced after exceeding the respective threshold load or be reduced to the basic load level by having the control surfaces, spoilers and flaps yield momentarily to the air forces and blow down. The magnitude of the blow down deflection of the surface, which must be approximately variably limitable to the threshold load, determines the degree of the loading reduction. The return of the displaced surfaces into their original position occurs contrary to the off-loading deflection slowly, meaning within a time period of 0.5 to 10 seconds. Since the above-mentioned additional loading must be reduced along the wing span where it is locally generated, several, preferably a plurality of controllable surfaces are to be arranged at the aircraft wing, which are respectively provided with an unloading apparatus.

The device 1, which according to FIG. 1 is installed at an actuating drive 12 between the airplane wing 1a and the control surfaces and/or spoilers and flaps 12a, consists of a closed damping circuit 2, which comprises a power cylinder 3 with a piston 3a and a piston rod 4. If the piston rod 4 is actuated by the loading of the control surfaces 12a, it conveys, by means of the piston 3a, oil through a supply line 24 after opening of an inlet or outlet valve 9. A check valve 8 closes a supply line 25 during forward motion of the piston 3a because of the inside pressure, which line is provided with an inlet or outlet valve 10 which can return from the outlet position to the closed position in a time span 0.5 to 10 seconds. The actuating drive is a hydraulic or electrical servo drive and can be coupled or decoupled in a known manner. The electrical servo drive (12) could be switched on or off by the piston rod 4 on the crank drive 7. The hydraulic actuating drive could be operated in a similar manner.

At the end 5 remote from the load of a piston rod 4 leading into a chamber 15, a straight line crank drive 7 is arranged, which supports itself at the wing structure 6 of the aircraft wing 1a. The chamber 15 can be filled with liquid and provided with flexible gas pressure containers 14 for additional dampening and return of the straight line crank drive 7 and it is equipped with an additional inlet or outlet valve 13, which is connected with a pressure accumulator 16.

The inlet- or outlet valve 9, 10 and 13 as well as the pressure accumulator 16 are automatically controllable or manually adjustable in a known manner by means of a flight controller 11 with respect to their opening- or closing forces or the pressure depending on the respective flying weight and the mach number of the aircraft. The additional inlet- or outlet valve 13 is hereby controlled in such a way, that it returns within a time period of 2 to 10 seconds from the outlet position into the closed position.

The straight line crank drive 7 is designed similar to a Nurnberg shears in a simple form or selectably in - a not-shown here- twin mirror-inverted symmetrical form. The shear elements 19, 19a, 20, 20a, spring loaded at the swivel joints 18a are, for the purpose of generation of a lever arm for the initiation of a travel shortening sliding motion in direction of the shear movement, designed in a kinked fashion pointing outwards and are provided with a crank articulation 22 at the connection to the piston rod 4 meaning at the force initiation end 21.

The straight line crank drive 7 can be attached with its end 17 remote from the piston rod at a support element 18, which is displaceable by means of the flight controller 11 power-driven or also manually in axial direction towards the piston rod 4 depending on the respective flying weight and the mach number of the aircraft.

The FIG. 2 shows a further refinement of the device 1, that apart from the power cylinder 3, a displacement cylinder 26 connected to common supply lines 24, 25 with a further piston 27 on a further piston rod 28 as well as a servo spool valve 29 can be assigned to a closed dampening circuit 39. The additional piston rod 28 is connected at one end 30 with a linkage 32 leading to a lever 31 and to the servo spool valve 29 and at the other end 33 with spring loaded straight line crank drive 7. In the area of the displacement cylinder 26, a known actable upon dampening cylinder 34 with an additional piston 35 and a cross-section changing spring valve 36 are arranged.

FIG. 2 shows the power cylinder 3 and the servo spool valve 29 in extended position without load off-loading deflection. If a force acts at the load connecting eye 40, a pressure is built up in the power cylinder 3, which is transmitted through the supply line 24 to the additional piston 27 and there generates a corresponding force. The force at the additional piston 27 is conducted through the additional piston rod 28 and the spring preloaded straight line crank drive 7 to the cylinder housing 41. In case of increasing outside force action at the load connecting eye 40 ultimately a threshold load is reached, at which the straight line crank drive 7 which is spring preloaded in its shear elements 19, 19a, 20, 20a suddenly yields and the additional piston 27 provides cylinder volume allowing hydraulic liquid to flow into it. The power cylinder 3 gives way to its load and contracts proportionately to the travel of the additional piston 27. Simultaneously the linkage 32, articulated to the additional piston rod 28, the servo spool valve 29 and the lever 31, is automatically activated in the sense of increasing the giving way travel of the power cylinder 3, by the servo spool valve 29 opening the supply through the supply line 25.

In the described giving way process the lever 31 is kept stationary.

After the movement of the additional piston 27 has stopped, the power cylinder 3 continues its displacement only for as long, until it itself closes the servo spool valve 29 by means of the linkage 32.

The resetting process into the original position occurs analogously, whereby it is assumed that the load acting from the outside at the load connection eye 40 after a certain time has been reduced back to the basic load, and that the lever 31 is being retained in its original position.

The preloaded spring 42 at the straight line crank drive 7 initiates a return displacement of the additional piston rod 28, which is magnified by the control coupling at the linkage 32.

The blocking of the load reduction occurs by means of a solenoid 38, which is attached at the adjustable support element 18. The additional piston rod 28 moves in the core of the solenoid 38 and can at any time, at least in its original position, be immobilized on command by means of an induced magnetic field.

Concerning the variation of the threshold load, there is the possibility to change the original position of the additional piston rod 28 with the help of the displaceable support element 18. A changed original position changes the geometry of the straight line crank drive 7 and thus the initial loading applied to the additional piston rod 28.

A variation in the threshold load can be effected through a revertive signal connection 37 from the lever 31 to the servomotor 43 of the support element 18, this in addition to the intervention possiblity of the pilot or the flight controller 11.

The advantages of the invention consist in particular in that the device for the reduction of the gust- and maneuver loads as well as for the increase of the flutter velocity meets the task definition in a simple way on the one hand with electro-hydraulic means, but also principally with hydraulic means. The registration of the additional load generated by the gust loads, at whose lower threshold with respect to the basic load the allowable threshold load lies, occurs by mechanical means, namely from the control surface etc., directly onto the device or onto the operating medium without having to utilize malfunction-prone mechanical or electronic apparatus.

The allowable threshold load is continuously automatically or manually tunable to the respective flying weight and mach number of the aircraft on the ground as well as in the air and thus the control force values required for the momentary load reduction are accurately adjustable through the wing loading. This additional loading is, apart from that, diminished along the wing span, by the multiple or numerous assignment of these devices at an equal number of control surfaces respectively, where it is locally generated, whereby concerning the static and dynamic loading a lower weight and an increase in useful life is achieved for the wing structure.

I claim:

1. Device for automatically controllable off-loading of aircraft wings, which is arranged between an aircraft wing structure and at least one of control surfaces, spoilers and flaps for their actuation, characterized in that at least one of the device (1) is assigned to the at least one of said control surfaces, spoilers and flaps (12a) along a wing span, comprising a dampening circuit (2), including a power cylinder (3) with a piston (3a) and an elongated piston rod (4) having a first end connected to a load and a second end (5) remote from the load connected with a spring-loaded straight line crank drive (7) supported at the wing structure (6) and that the power cylinder (3) is equipped with a check valve (8) and with inlet- or outlet valves (9,10) and said valves are automatically controllable with respect to their opening or closing forces by means of a flight controller (11) depending on the respective flying weight and the mach number of the aircraft.

2. Device according to claim 1, characterized in that the device (1) is arranged at a hydraulic or electrical servo drive (12) which can be decoupled from it, for the actuation of the at least one of the control surfaces, spoilers and flaps (12a).

3. Device according to claim 1, characterized in that the inlet- or outlet valve (10) is controlled in such a way that it returns within a time span of 0.5 to 10 seconds from the outlet position to the closed position.

4. Device according to claim 1, characterized in that the straight line crank drive (7) is arranged in a chamber (15) filled with liquid and equipped with an additional inlet- or outlet valve (13) as well as with flexible gas pressure containers (14) whereby the additional inlet- or outlet valve (13) is automatically controllable by means of the flight controller (11) depending on the respective flying weight and the mach number with respect to the opening- or closing forces.

5. Device according to claim 4, characterized in that the additional inlet- or outlet valve (13) is connected with a pressure accumulator (16), with the pressure being automatically controllable of the flight controller (11) depending on the respective flying weight and the mach number of the aircraft.

6. Device according to claim 5, characterized in that the opening- or closing forces of the inlet- or outlet valves (9, 10) and those of the additional inlet- and outlet valve (13) as well as the pressure of the pressure accumulator (16) is manually adjustable.

7. Device according to claim 1 or 4, characterized in that the straight line crank drive (7) has a first end and a second end and is attached at the first end (17) remote from the piston at a support element (18), which is displaceable axially with respect to the piston rod (4) by motor power or manually depending on the respective flying weight and the mach number of the aircraft.

8. Device according to claim 1, characterized in that the straight line crank drive (7) is designed similar to Nurnberg shears which shortens travel when acted upon by a force with spring-loaded shear elements (19, 19a, 20, 20a) formed in an outwardly pointing kinked fashion for the initiation of a sliding motion and at the force application end (21) are connected with a crank joint element (22).

9. Device according to claim 1, 2, 3, 4, 5 or 6, characterized in that apart from the power cylinder (3) a displacement cylinder (26) connected to common supply lines (24, 25) with an additional piston (27) and an additional piston rod (28) as well as a servo spool valve (29) are assigned to the dampening circuit (2), whereby the additional piston rod (28) at one end (30) is connected with a linkage (32) leading to a lever (31) and to the servo spool valve (29) and at the other end with the spring-loaded straight line crank drive (7).

10. Device according to claim 9, characterized in that the displacement cylinder (26) is mechanically connected with a dampening cylinder (34), which comprises an additional piston (35) and a cross-section changing spring valve (36).

11. Device according to claim 7, characterized in that the force/travel characteristic of the straight line crank drive (7) is adjustable by means of the support element (18) displaceable by a servomotor (43) or manually in such a way, that movement commands can be conducted over a connection (37) arranged between the lever (31) and a support element (18).

12. Device according to claim 7, characterized in that a radial solenoid (38) is arranged at the support element (18) in such a way that in its central cavity the additional piston rod (28) is movable and arrestable by means of the induced magnetic field.

13. Device according to claim 9 characterized in that the transmission ratio at the linkage (32) between the servo spool valve (29) and the lever (31) is automatically controllable or manually adjustable by means of the flight controller depending on the respective flying weight.

14. Device according to claim 1, characterized in that the opening- or closing forces of the inlet- or outlet valves (9, 10) are manually adjstable.

15. Device according to claim 4, characterized in that the opening- or closing forces of the inlet- or outlet valves (9, 10) and those of the additional inlet- and outlet valve (13) are manually adjustable.

* * * * *